(12) United States Patent
Nakajima et al.

(10) Patent No.: US 6,302,434 B2
(45) Date of Patent: *Oct. 16, 2001

(54) STRUCTURE FOR PLACEMENT OF HEAD PROTECTING AIR BAG BODY

(75) Inventors: Hiroki Nakajima, Nagoya; Toshimitu Watanabe, Okazaki, both of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,175

(22) Filed: Sep. 9, 1998

(30) Foreign Application Priority Data

Oct. 15, 1997 (JP) .................................................. 9-281615

(51) Int. Cl.[7] .................................................. B60R 21/22
(52) U.S. Cl. .................................... 280/730.2; 280/730.1
(58) Field of Search .............................. 280/730.1, 730.2

(56) References Cited

U.S. PATENT DOCUMENTS

| 5,238,263 | * | 8/1993 | Sinnhuber | 280/730 |
|---|---|---|---|---|
| 5,265,903 | * | 11/1993 | Kuretake et al. | 280/730 |
| 5,322,322 | | 6/1994 | Bark et al. | |
| 5,462,308 | * | 10/1995 | Seki et al. | 280/730.2 |
| 5,480,181 | | 1/1996 | Bark et al. | |
| 5,540,459 | * | 7/1996 | Daniel | 280/730.2 |
| 5,588,672 | * | 12/1996 | Karlow et al. | 280/730.1 |
| 5,605,346 | * | 2/1997 | Cheung et al. | 280/730.2 |
| 5,660,414 | | 8/1997 | Karlow et al. | |
| 5,791,683 | * | 8/1998 | Shibata et al. | 280/730.2 |
| 5,899,491 | * | 5/1999 | Tschaeschke | 280/730.1 |

FOREIGN PATENT DOCUMENTS

| 2191450 | * | 12/1987 | (GB) . |
| 06227340 | * | 8/1994 | (JP) . |
| 6-227340 | | 8/1994 | (JP) . |
| 9-207701 | | 8/1997 | (JP) . |
| 96/26087 | | 8/1996 | (WO) . |
| 9626087 | * | 8/1996 | (WO) . |

* cited by examiner

Primary Examiner—Brian L. Johnson
Assistant Examiner—Joselynn Y. Sliteris
(74) Attorney, Agent, or Firm—Pillsbury Winthrop LLP

(57) ABSTRACT

A structure for the placement of a head protecting air bag body which is provided from a front pillar to along a roof side rail and expands into a curtain-like form, comprising: an opening trim which is fixed to a mounting portion of a vehicle door opening portion at which the opening trim is mounted to the vehicle door opening portion; and an air bag body expansion guide means which guides the expanding of the air bag body such that the air bag body expands without contacting the mounting portion of the vehicle door opening portion.

16 Claims, 5 Drawing Sheets

STRUCTURE FOR PLACEMENT OF HEAD PROTECTING AIR BAG BODY

BACKGROUND OF THE INVENTION

1. Field of the Invention

The present invention relates to a structure for the placement of a head protecting air bag body of a head protecting air bag apparatus in which, at the time when a predetermined high load is applied to a vehicle side portion, gas is ejected from an inflator such that the head protecting air bag body, which is accommodated along a roof side rail portion from a pillar portion, expands to form a curtain-like form due to the ejected gas.

2. Description of the Related Art

In order to improve the protection of the head of a vehicle occupant seated in the front seat when a predetermined high load is applied to a vehicle side portion, there have been proposed head protecting air bag apparatuses in which an air bag body, which is accommodated in a folded state along a front pillar portion and a roof side rail portion, is inflated so as to expand into a curtain-like form. The structure of such a head protecting air bag apparatus is disclosed in International Publication No. WO 96/26087, and will be described hereinafter.

As shown in FIG. 5, the head protecting air bag apparatus 100 comprises, as main components, an elongated duct 106 which is disposed so as to extend from a front pillar portion 102 along a roof side rail portion 104, an air bag body 112 which is accommodated in the duct 106 in a folded state and which is fixed to the vehicle body at a front end fixing point 108 and a rear end fixing point 110, an inflator 116 which is connected to the rear end portion of the duct 106 by a hose 114 and which ejects gas when a predetermined high load is applied to the vehicle side portion, and a strap 118 whose one end portion is fixed to the vehicle body and whose other end portion is fixed to the rear end portion of the air bag body 112. Further, the air bag body 112 is formed by connecting together a plurality of cells 120, each of which is formed in a substantially cylindrical shape whose longitudinal direction corresponds to a substantially vertical direction of the vehicle.

In accordance with the above-described structure, when a predetermined high load is applied to a vehicle side portion, gas is ejected from the inflator 116. The ejected gas flows into each of the cells 120 of the folded air bag body 112 via the hose 114 and the duct 106. As a result, each of the cells 120 is inflated so as to form a substantially cylindrical shape whose longitudinal direction substantially corresponds to the vertical direction of the vehicle. Accordingly, the air bag body 112 is inflated to form a curtain-like form along a window glass 122. Further, because the rear end portion of the air bag body 112 is connected to the vehicle body by the strap 118, the rear end portion of the air bag body 112 is reliably disposed at the inner side of the upper portion of a center pillar 124.

However, in this head protecting air bag apparatus 100, because the air bag body 112 is disposed so as to span between the front pillar portion 102 and the roof side rail portion 104, the air bag body 112 is covered with, for example, a front pillar garnish and a roof head lining. As a result, at the time of expansion of the air bag body, portions adjacent to the edge portions of the front pillar garnish and the roof head lining are deformed, and the air bag body expands forwards the vehicle interior from the deformed portions. Further, an opening trim is fitted into a vehicle door opening portion for the purpose of protecting the respective edge portions of the front pillar panel, the roof side rail panel, and the like. For this reason, at the time of expansion of the air bag body, the air bag body directly contacts the mounting portion of the opening trim which is fitted into the vehicle door opening portion, and a large amount of force is applied to the mounting portion of the opening trim. As a result, the mounting portion of the opening trim is made to deform as if opening, or the like, and the opening trim may come away from the vehicle door opening portion.

SUMMARY OF THE INVENTION

In view of the aforementioned, it is an object of the present invention to provide a structure for the placement of a head protecting air bag body which prevents an opening trim from coming away from an opening portion of a vehicle door at the time of expansion of the air bag body.

The first aspect of the present invention is a structure for the placement of a head protecting bag body which is provided from a front pillar to along a roof side rail and expands into a curtain-like form, comprising an opening trim which is fixed to a mounting portion of a vehicle door opening portion at which the opening trim is mounted to the vehicle door opening portion; and an air bag body expansion guide means which guides the expansion of the air bag body such the air bag body expands without contacting the mounting portion of the vehicle door opening portion.

Accordingly, at the time of expansion of the air bag body, the air bag body is guided by the air bag body expansion guide means in a direction in which the air bag body does not contact the mounting portion at which the opening trim is mounted to the vehicle door opening portion. For this reason, the air bag provided at the vehicle door portion does not contact the mounting portion for the opening trim so that a large load is not applied to the mounting portion. As a result, at the time of expansion of the air bag body, the opening trim is prevented from coming away from the vehicle door opening portion.

In the second aspect of the present invention, in the structure for the placement of a head protecting air bag body of the first aspect, wherein the air bag body expansion guide means is a protruding portion which is provided at at least one of an inner panel of the front pillar and an inner panel of the. roof side rail, at a region adjacent to the opening trim.

Accordingly, the protruding portion which serves as the air bag body expansion guide means can be formed by slightly changing the structure of the inner panel, and it is possible to mold the protruding portion at the same time the inner panel is being press molded. As a result, the manufacturing of the inner panel is facilitated, and decrease in the strength of each of the front pillar and the roof side rail can be prevented.

DESCRIPTION OF THE PREFERRED EMBODIMENTS

With reference to FIGS. 1 to 4, a description of an embodiment of a structure for the placement of a head protecting air bag body according to the present invention will be given hereinafter.

In the figures, arrow FR indicates the vehicle front direction, arrow UP indicates the vehicle upper direction, and arrow IN indicates the direction toward the inner side in the vehicle transverse direction.

Figure 4:
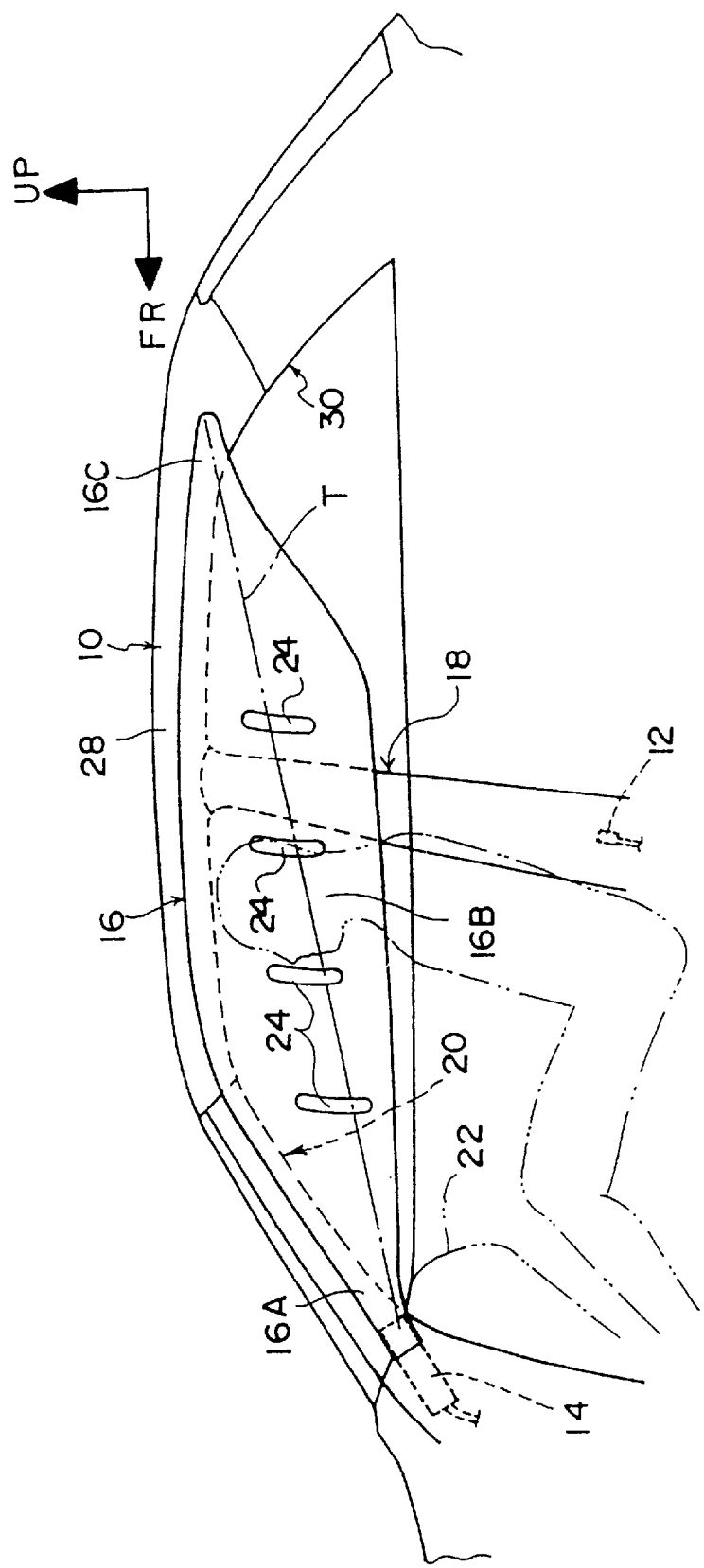
FIG. 4 is a schematic side view of a state in which expansion of the air bag body has been completed at the side of the front passenger's seat in the vehicle interior, to which is applied the structure for the placement of the head protecting air bag body according to the present embodiment.
Figure 5:
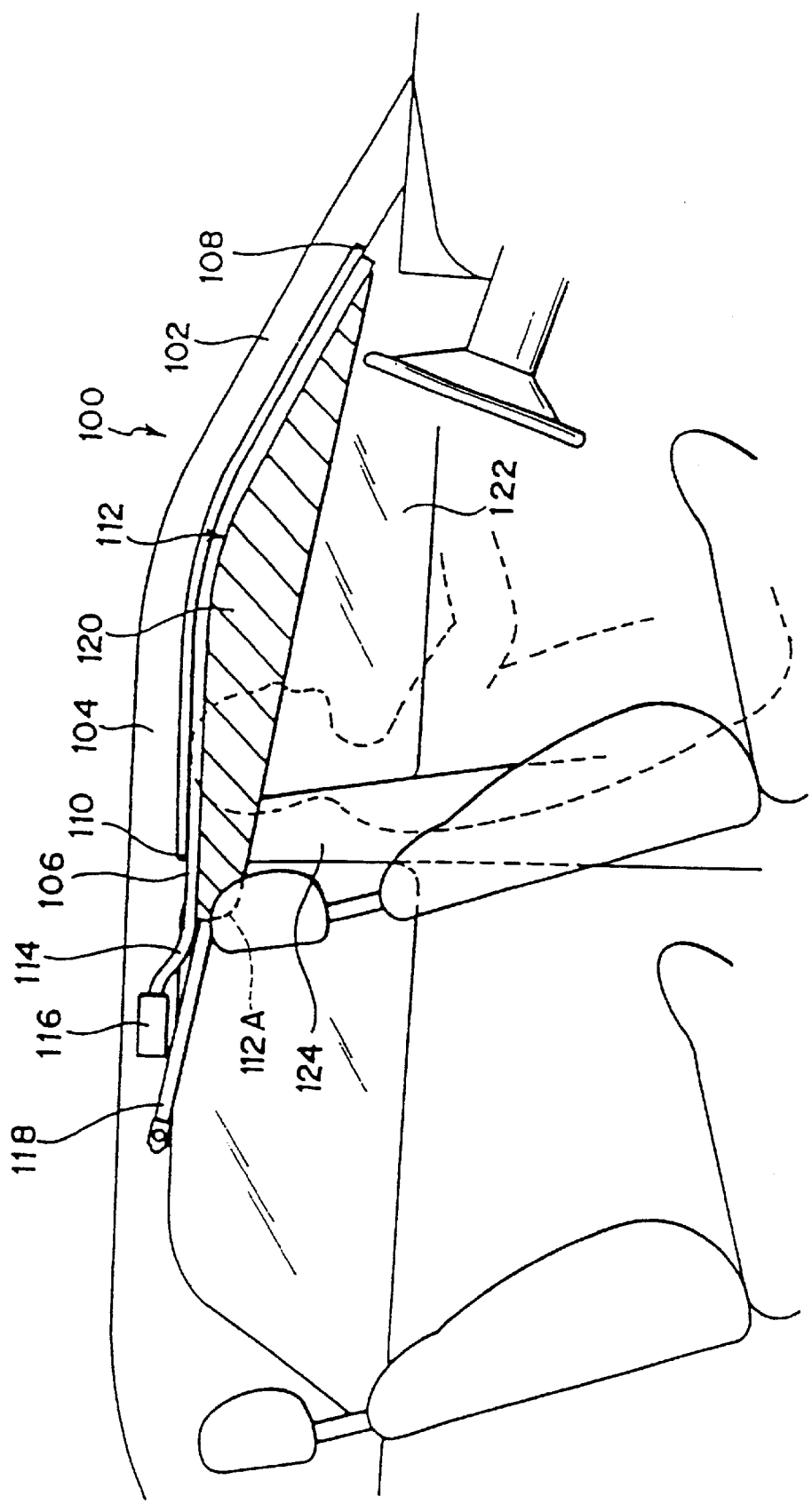
FIG. 5 is a schematic side view of a state in which expansion of an air bag body in a head protecting air bag apparatus according to a conventional example has been completed.

As shown in FIG. 4, a head protecting air bag apparatus 10 according to the present embodiment is mainly comprised of a sensor 12 for detecting the state of a side collision of the vehicle, a cylindrical inflator 14 which ejects gas due to the operation thereof, and an air bag body 16. The sensor 12 is disposed in the vicinity of the lower end portion of a center pillar (B pillar) 18, and detects a state of a side collision of the vehicle when a side collision load which is greater than or equal to a predetermined value is applied to the vehicle side portion.

The inflator 14 is disposed in the vicinity of the connected portion of a front pillar (A pillar) and an instrument panel 22, and is connected to the aforementioned sensor 12. Therefore, when the sensor 12 detects a state of a side collision of the vehicle, the inflator 14 is operated.

At the intermediate potion of the air bag body 16 in the vertical direction thereof when viewed from the side, a plurality of non-inflation portions 24, each of which intersects a tension line T connecting a front fixing point and a rear fixing point of the air bag body 16 and whose longitudinal direction corresponds to the vertical direction of the air bag body 16, are formed so as to be spaced apart from each other at predetermined distances. Accordingly, at the time of expansion of the air bag body 16, a plurality of cylindrical inflation portions, which are provided substantially parallel to each other and which intersect the tension line T, are formed by these non-inflation portions 24.

A front end portion 16A of the air bag body 16 is disposed at the position at which the inflator 14 is disposed such that the gas ejected from the inflator 14 flows into the front end portion 16A. The upper end edge portion of an intermediate portion 16B of the air bag body 16 is disposed along a front pillar 20 and a roof side rail 28. The upper end edge portion of a rear end portion 16C of the air bag body 16 is disposed in the vicinity of a quarter pillar (C pillar) 30.

Figure 3:
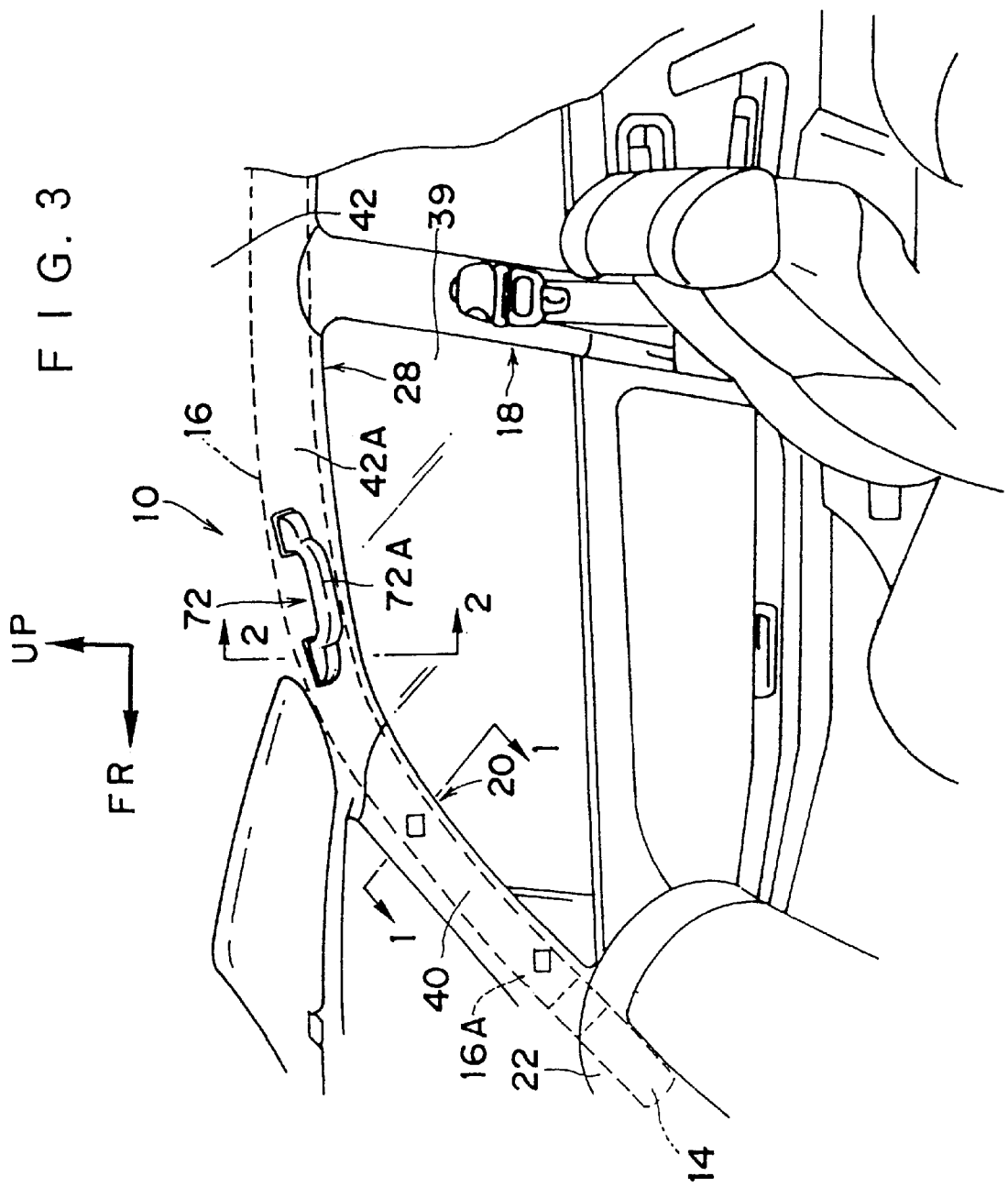
FIG. 3 is a schematic side view of an accommodated state of an air bag body at the front side portion of the front passenger's seat in a vehicle interior, to which is applied the structure for the placement of a head protecting bag body according to an embodiment of the present invention.

The air bag body 16 is folded in a bellows shape in a substantially vertical direction so as to form an elongated shape. In this state, the air bag body 16 is stored so as to extend from a front pillar garnish 40 to the vehicle transverse direction outer side portion of a roof head lining 42 as shown in FIG. 3. Further, the air bag body 16 is maintained in the folded state by a portion of the folded air bag body 16 being wrapped by a wrapping member which can be easily broken, or by portions of the folded air bag body 16 being tacked by tape-shaped surface fastener straps.

Figure 1:
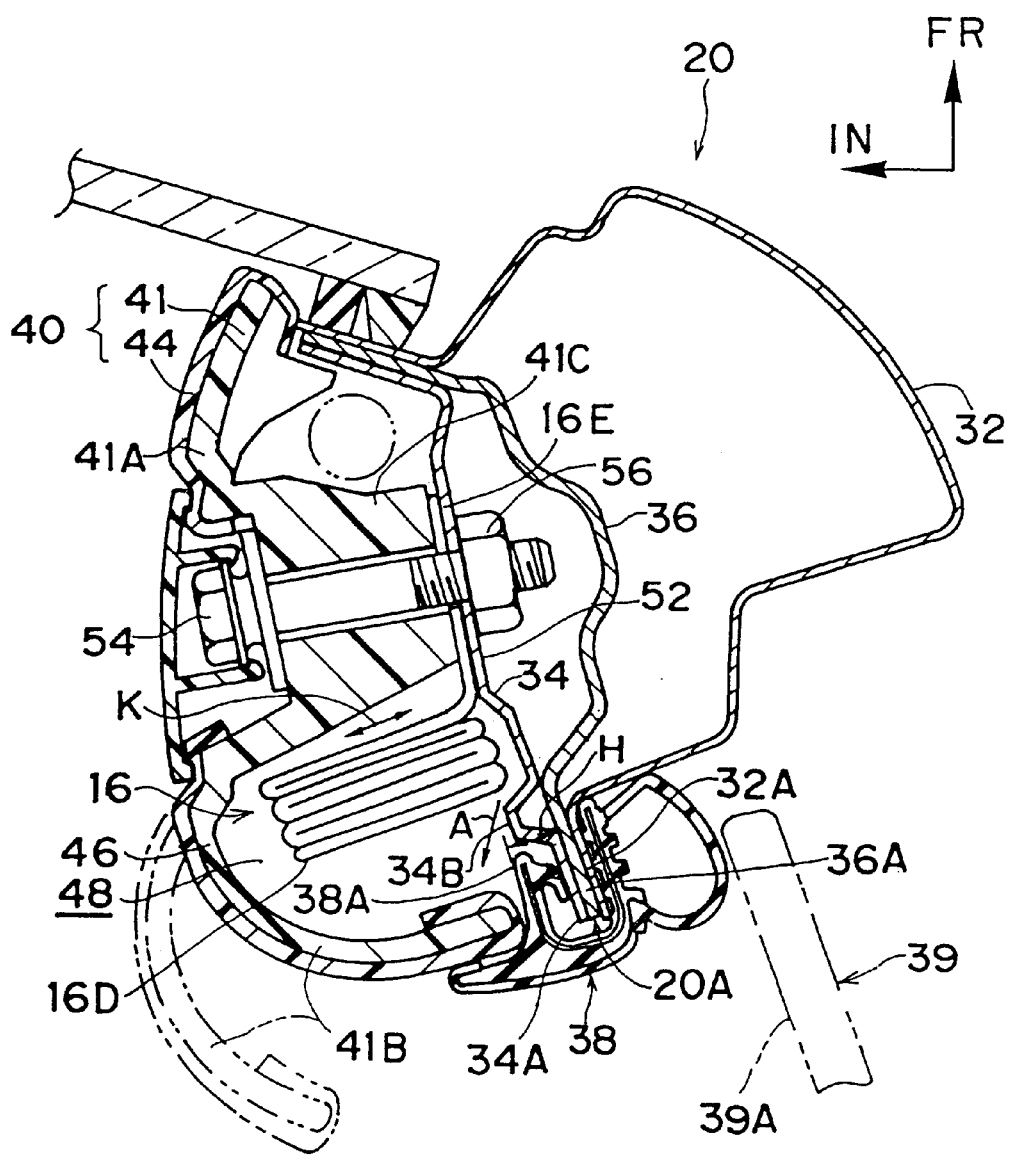
FIG. 1 is an enlarged cross sectional view taken along line 1—1 FIG. 3.

As shown in FIG. 1 which illustrates the structure for accommodating the air bag at the front pillar, the front pillar 20 is formed to have a closed cross sectional configuration by a pillar outer panel 32 whose cross section is formed in a hat shape and which is disposed at the outer side of the vehicle interior, and by a pillar inner panel 34 serving as an inner panel and formed in a substantial plate shape and disposed at the inner side of the vehicle interior, and by a pillar reinforcement 36 whose cross section is formed in a substantial hat shape and which is disposed between the pillar outer panel 32 and the pillar inner panel 34 in a nipped state.

A mounting portion 38A of an opening trim 38, which mounting portion 38A has a U-shaped cross section, is resiliently fitted into a rear end flange portion 20A of the front pillar 20 which forms a portion of the opening portion of a vehicle door. Namely, the mounting portion 38A is resiliently fitted at the connected portion of a rear end flange 32A of the pillar outer panel 32, a rear end flange 34A of the pillar inner panel 34, and a rear end flange 36A of the pillar reinforcement 36.

In the front pillar 20, a resin pillar garnish 40 is disposed at the pillar inner panel 34 at the vehicle interior inner side of the pillar inner panel 34. The pillar garnish 40 is made from a resin material which has a predetermined hardness, and is comprised of a base member 41 which is formed in a convex and curved shape, and a surface covering portion 44 which covers the surface of the base member 41 (i.e., the surface at the vehicle interior inner side). Further, the front side portion of the base member 41 of the pillar garnish 40 is made thicker (hereinafter, this portion will be referred to as a "base portion 41A"), and the rear side portion of the base member 41 is made thinner (hereinafter, this portion will be referred to as a "bag accommodating portion 41B"). Accordingly, the base portion 41A is set to have a high degree of rigidity, while the bag accommodating portion 41B is set to have a lower degree of rigidity than the base portion 41A. The rigidity of the base portion 41A is set so as to ensure the rigidity of mounting of the base portion 41A to the front pillar 20. The rigidity of the bag accommodating portion 41B is set so as to ensure smooth opening of the bag accommodating portion 41. The portion at which the base portion 41A and the bag accommodating portion 41B are connected (i.e., a portion of sudden change in rigidity, which is formed at the transverse direction intermediate portion of the pillar garnish 40 along the longitudinal direction thereof) serves as a hinge portion 46 when the bag accommodating portion 41B opens as shown in FIG. 1 by a double-dashed line. Moreover, the terminal end portion of the pillar garnish 40 at the bag accommodating portion 41B side is resiliently engaged with the aforementioned opening trim 38.

A predetermined space 48 is formed between the base member 41 of the pillar garnish 40 and the pillar inner panel 34 by disposing the pillar garnish 40, which is formed in a convex and curved shape, so as to be spaced apart by a predetermined distance from the pillar inner panel 34 which is formed in a substantial plate shape. A resin rib (not shown), which functions as an energy absorbing member for absorbing the secondary impact load which is applied to a vehicle occupant's head at the time of a low load side collision (i.e., at the time a side collision load of a degree which does not operate the air bag apparatus 10 is applied), is disposed at the front side of the space 48 so as to traverse the space 48.

A bag front portion 16D is stored in the space 48 at the rear side thereof. The bag front portion 16D is disposed in a state in which it is folded in a bellows shape in a direction substantially orthogonal to a vehicle interior inner side surface 39A of a door glass 39 (i.e., the bag front portion 16D is folded in the directions of arrow K). Further, a plurality of fixed portions 16E, each of which is fillet shaped, are provided so as to be spaced apart from each other at an appropriated distance. Each of the fixed portions 16E is inserted between a seat portion 41C of the base member 41 and a convex portion 52 of the pillar inner panel 34. In this state, the fixed portion 16E is fastened to the seating portion 41C of the base member 41 of the pillar garnish 40, and the convex portion 52 of the pillar inner panel 34 by a fixing means such as a bolt 54 and a nut 56.

In the present embodiment, in the vicinity of the front portion of the rear end flange 34A of the pillar inner panel 34, a protruding portion 34B serving as an air bag body expansion guide means projects toward the pillar garnish 40 side. The protruding portion 34B is formed by a portion of the pillar inner panel 34 being bent to have a trapezoidal cross-sectional configuration, and the height of the protruding portion 34B is substantially equal to or greater than a height H of the mounting portion 38A from the rear end flange 34A.

Figure 2:
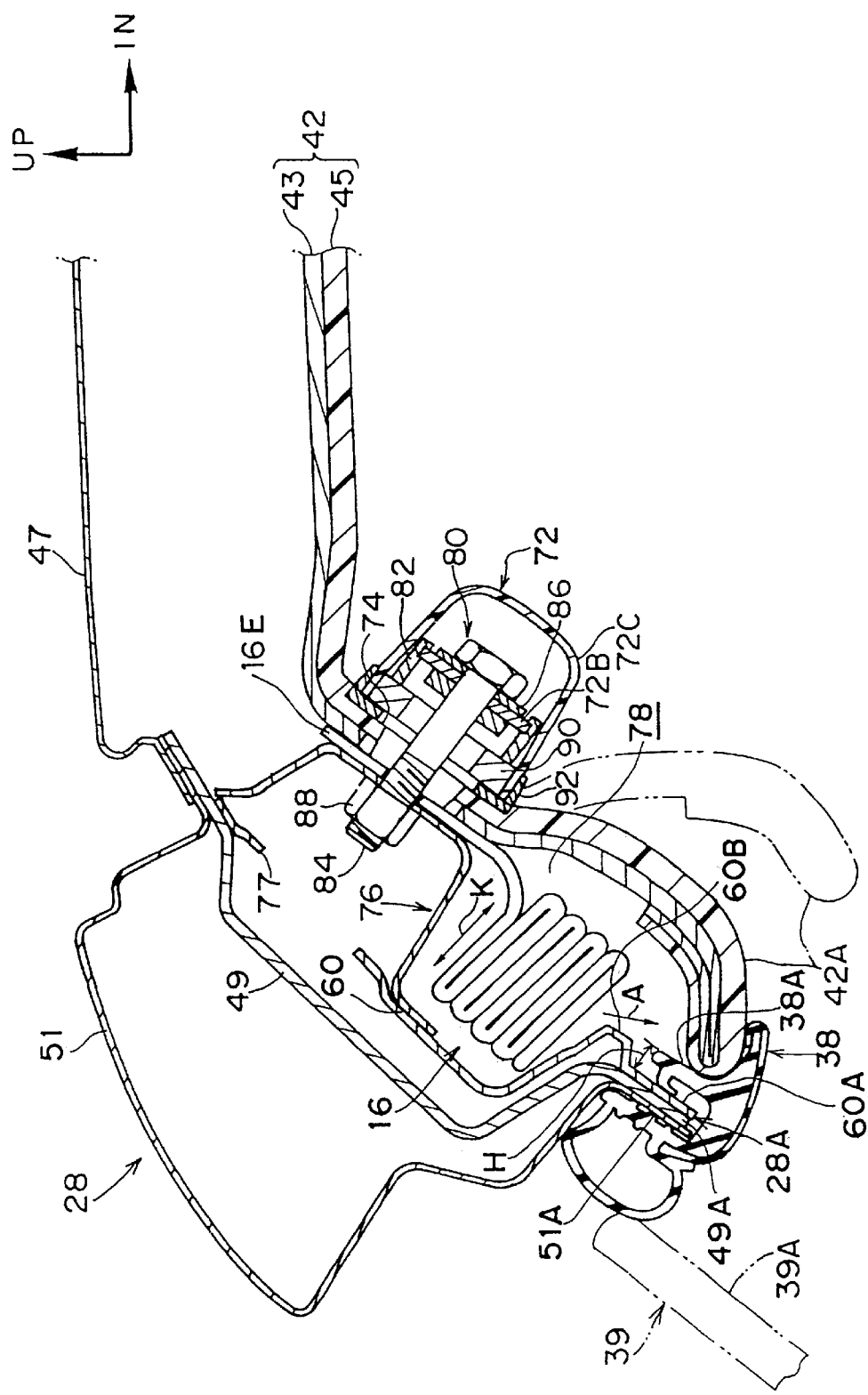
FIG. 2 is an enlarged cross sectional view taken along line 2—2 in FIG. 3.

As shown in FIG. 2 which illustrates the structure for accommodating the air bag at the roof side rail, the roof side rail 28 is structured by a rail outer panel 51 whose cross section is formed in a substantial hat shape and which projects by a relatively large amount toward the outer side of the vehicle interior, a rail inner panel 60 which serves as an inner panel and which slightly projects toward the inner side of the rail outer panel 51, and a rail reinforce 49 whose cross section is formed in a substantial hat shape along the rail outer panel 51 and which is nipped between the rail outer panel 51 and the rail inner panel 60. Both end portions of each of the rail outer panel 51, the rail inner panel 60, and the rail reinforce 49 are connected to each other by welding so as to form closed cross sections. Further, the upper end portion of the roof side rail 28 which is formed by the above-described three elements is connected by welding to the vehicle transverse direction outer side end portion of the roof panel 47.

The mounting portion 38A, whose cross section is U-shaped, of the opening trim 38 is resiliently fitted on the lower end flange portion 28A of the roof side rail 28 which forms a portion of the opening portion of the vehicle door, i.e., the mounting portion 38A is resiliently fitted on the portion at which a lower end flange 51A of the rail outer panel 51, a lower end flange 49A of the rail reinforce 49, and a lower end flange 60A of the rail inner panel 60 are connected together.

A bracket 76, whose cross section is formed in a substantial hat shape and whose thickness is less than that of the rail inner panel 60 and which serves as an energy absorbing member, is fixed to the vehicle interior inner side surface of the rail inner panel 60 of the roof side rail 28. Moreover, a through hole 77 is formed in the rail inner panel 60 at a position opposing the bracket 76.

A roof head lining 42 is made from resin and is formed by a base member 43 and a surface covering portion 45. When the air bag body 16 is expanded, due to an expanding and inflating force of the air bag body, the vehicle transverse outer side portion 42A of the roof head lining 42 opens toward the vehicle interior inner side as shown in FIG. 2 by a double-dashed line, and from this opening, the air bag body 16 expands into the vehicle interior.

A concave portion 74 which is recessed toward the roof side rail 28 is formed at the vehicle transverse direction outer side portion 42A of the roof head lining 42 (at a predetermined position of the roof side rail 28).

The air bag body 16 is accommodated in a space 78 which is enclosed by the outer end portion of the roof head lining 42, the rail inner panel 60, and the bracket 76. The air bag body 16 is disposed in a state in which it is folded in a bellows shape in a direction substantially orthogonal to the vehicle interior inner side surface 39A of the door glass 39 (i.e., the directions indicated by arrow K in FIG. 1). Moreover, the fixed portions 16E, each of which is formed in a fillet shape, are disposed so as to be apart from each other at a suitable distance, and extend along the bracket 76 and the concave portion 74. Accordingly, at the time of a vehicle side collision in which the vehicle occupant's head secondarily collides with an assist grip 72, the bracket 76 which has been made thinner is deformed plastically such that energy is absorbed. At this time, a fastener 80, which will be described later, is withdrawn into the closed cross section through the aforementioned through hole 77 which is formed in the rail inner panel 60. Moreover, a rib for absorbing an energy at the time when a vehicle occupant's head secondarily collides during a collision may be disposed at a position which opposes the air bag body 16 (i.e., a position between the upper end portion of the roof side rail 28 and the roof head lining 42).

The resin assist grip 72 is disposed in the concave portion 74 of the aforementioned roof head lining 42. The assist grip 72 is formed by a grip portion 72A (see FIG. 3) which is gripped by the vehicle occupant, and plate shaped mounting portions 72B (see FIG. 2) which is provided at the longitudinal end portions of the grip portion 72A, and cover portions 72C which cover the mounting portions 72B. The assist grip 72 is fixed by fasteners 80, each of which is structured by a collar 82, a fixing bolt 84, a washer 86, and a nut 88.

The fixed portion 16E of the air bag body 16 is disposed in a contacting state between the vehicle interior outer side surface of the concave portion 74 of the roof head lining 42 and the vehicle interior inner side surface of the bracket 76. The fixed portion 16E of the air bag body 16 is fastened together with the assist grip 72 by the fasteners 80 used for fixing the assist grip 72. The assist grip 72 is fastened at two fixing points, one at the front and one at the back. The fixed portion 16E of the air bag body 16 is fastened together with the assist grip 72 at both of these fixing points.

A resin cushion 90 is disposed between the collar 82, and the concave portion 74 of the roof head lining 42. A seating 92 is provided at the periphery of the cushion 90 at the roof head lining 42 side. The seating 92 is made from a metal or the like and has a high rigidity, and is nipped between the external peripheral portion of the cushion 90 and the roof head lining 42.

In the present embodiment, the protruding portion 60B of the rail inner panel 60 projects toward the roof head lining 42 side in the vicinity of the upper side portion of the lower end flange 60A of the rail inner panel 60. The protruding portion 60B is formed by a portion of the rail inner panel 60 being bent so as to form a trapezoidal cross-section. The height of the protruding portion 60B is substantially greater than or equal to the height H of the mounting portion 38A from the rear end flange 60A.

The above-described structure for fastening the air bag body 16 is similarly employed at the assist grips provided at the vehicle rear seat side. The fasteners used exclusively for fixing the air bag body 16 to the vehicle body are disposed so as to be apart from each other at a suitable distance. These fasteners are provided at portions of the air bag body 16 at which the assist grip 72 is not disposed.

Next, operation of the present embodiment will be explained.

In the present embodiment, when a side collision load which is greater than or equal to a predetermined value is applied to the side portion of a vehicle body, the occurrence of the side collision is detected by the sensor 12. For this reason, the inflator 14 is operated, and a predetermined amount of gas is ejected from the inflator 14. Accordingly, the air bag body 16 begins to inflate, and the inflated air bag body 16 thereby expands out in a curtain-like form to beneath the front pillar 20 and the roof side rail 28, while pushing open the pillar garnish 40 and the vehicle transverse direction outer side portion 42A of the roof head lining 42.

At this time, the air bag body 16 is guided so as to expand in a direction in which the air bag body 16 does not contact the mounting portion 38A of the opening trim 38 (i.e., the direction indicated by an arrow A in FIGS. 1 and 2) along the protruding portion 34B of the pillar inner panel 34 and the protruding portion 60B of the rail inner panel 60. For this reason, the air bag body 16 does not contact the mounting portion 38A of the opening trim 38 directly, and a large amount of load does not act upon the opening trim 38. As a result, when the air bag body is expanded, the opening trim 38 does not come away from the opening portion of the vehicle door.

Further, in the present embodiment, the protruding portion 34B serving as an air bag body expansion guide means is formed by a portion of the pillar inner panel 34 being bent so as to have a trapezoidal cross-section. The protruding portion 60B serving as an air bag body expansion guide means is formed by a portion of the rail inner panel 60 being bent so as to have a trapezoidal cross-section. Accordingly, a small structural change suffices. Further, when the pillar inner panel 34 and the rail inner panel 60 are molded by press molding, the protruding portions 34B and 60B can be molded at the same time, such that manufacturing is facilitated and there is no decrease in strength of the front pillar 20 or the roof side rail 28.

The present invention has been described in detail herein with reference to a specific embodiment. However, the present invention is not limited to the same, and it will be apparent to those skilled in the art that various embodiments are possible within the scope of the invention. For example, in the present embodiment, the protruding portions 34B and 60B serving as air bag body expansion guide means are formed by respective portions of the pillar inner panel 34 and the rail inner panel 60 being bent so as to form trapezoidal cross-sections. However, instead of the protruding portion 34B and the protruding portion 60B, guide plates or the like serving as air bag body expansion guide means may be fixed to the pillar inner panel 34 and the rail inner panel 60.

Further, in the present embodiment, the air bag body 16 is maintained in the folded state by a portion of the folded air bag body 16 being wrapped by a wrapping member which can be broken easily, or by portions of the folded air bag body 16 being tacked by tape-shaped surface fastener straps. However, instead of this, the configuration of the air bag body can be maintained by the air bag body being housed in a case.

Moreover, the structure for the placement of the head protecting air bag body according to the present invention can be applied to an air bag apparatus in which the inflator is provided at the rear side of a vehicle, for example, at a quarter pillar (C pillar) 30.

What is claimed is:

1. A head protecting device for a vehicle occupant, the device comprising:
   an air bag assembly structured for installation in a vehicle above a vehicle window and beside a vehicle seat, the air bag assembly including an inflatable air bag configured for expansion in a downward direction along the window in curtain-like form when the air bag is inflated;
   an inner panel configured for securely positioning the air bag;
   an opening trim secured to a bottom portion of the inner panel, the trim being disposed downstream from the air bag and along the downward direction of expansion; and
   an air bag expansion guide for directing expansion of the air bag in order to prevent deformation of the opening trim when the air bag is inflated, wherein the air bag expansion guide is a protruding portion formed when a portion of the inner panel bends.

2. The device according to claim 1, wherein the protruding portion extends in a direction orthogonal to the air bag direction of expansion.

3. The device according to claim 1, wherein the protruding portion is formed such that a vehicle transverse direction cross-sectional configuration thereof is trapezoidal.

4. The device according to claim 1, wherein the air bag is folded and installed along a side roof rail portion and a front pillar portion of the vehicle.

5. The device according to claim 1, wherein the air bag is installed by being folded in a direction substantially orthogonal to a vehicle window pane.

6. The device according to claim 1, wherein the inner panel includes a front pillar inner panel and a side roof rail inner panel.

7. The device according to claim 1, wherein the inner panel is secured on a side member of the vehicle.

8. The device according to claim 1, wherein the inner panel is secured within a side member of the vehicle.

9. A head protecting device for a vehicle occupant, the device comprising:
- an air bag assembly structured for installation in a vehicle above a vehicle door and beside a vehicle seat, the air bag assembly including an inflatable air bag configured for expansion in a downward direction along a door surface in curtain-like form when the air bag is inflated;
- an inner panel configured for securely positioning the air bag;
- an opening trim secured to a bottom portion of the inner panel, the trim being disposed downstream from the air bag and along the downward direction of expansion; and
- an air bag expansion guide for directing expansion of the air bag in order to prevent deformation of the opening trim when the air bag is inflated, the air bag expansion guide and the inner panel being different members.

10. The device according to claim 9, wherein the protruding portion extends in a direction orthogonal to the air bag direction of expansion.

11. The device according to claim 9, wherein the protruding portion is formed such that a vehicle transverse direction cross-sectional configuration thereof is trapezoidal.

12. The device according to claim 9, wherein the air bag is installed by being folded in a direction substantially orthogonal to a windowpane of the vehicle.

13. The device according to claim 9, wherein the inner panel includes a front pillar inner panel and a side roof rail inner panel.

14. The device according to claim 9, wherein the inner panel is secured on a side member of the vehicle.

15. The device according to claim 9, wherein the inner panel is secured within a side member of the vehicle.

16. The device according to claim 9, wherein said air bag is folded and installed along side a roof side rail portion and a front pillar portion.

* * * * *